United States Patent
Patil et al.

(10) Patent No.: US 9,769,743 B2
(45) Date of Patent: Sep. 19, 2017

(54) METHOD AND APPARATUS FOR DETERMINING ACCESS POINT SERVICE CAPABILITIES

(75) Inventors: Basavaraj Patil, Coppell, TX (US); Gabor Bajko, Mountain View, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/642,357

(22) PCT Filed: Apr. 21, 2011

(86) PCT No.: PCT/IB2011/051761
§ 371 (c)(1),
(2), (4) Date: Oct. 19, 2012

(87) PCT Pub. No.: WO2011/132174
PCT Pub. Date: Oct. 27, 2011

(65) Prior Publication Data
US 2013/0039275 A1    Feb. 14, 2013

Related U.S. Application Data

(60) Provisional application No. 61/326,459, filed on Apr. 21, 2010.

(51) Int. Cl.
*H04W 48/20* (2009.01)
*H04W 4/20* (2009.01)
(Continued)

(52) U.S. Cl.
CPC .............. *H04W 48/20* (2013.01); *H04W 4/20* (2013.01); *H04W 36/36* (2013.01); *H04W 48/08* (2013.01)

(58) Field of Classification Search
CPC ........ H04W 4/20–4/22; H04W 36/34–36/365; H04W 48/08–48/20
(Continued)

(56) References Cited

U.S. PATENT DOCUMENTS 6,970,459 B1 * 11/2005 Meier ........................ 370/389
2004/0246920 A1    12/2004 Savolainen
(Continued)

FOREIGN PATENT DOCUMENTS

CN    101044714 A    9/2007
CN    101395949 A    3/2009
(Continued)

OTHER PUBLICATIONS

International Search Report for Application No. PCT/IB2011/051761, dated Aug. 17, 2011.
(Continued)

*Primary Examiner* — Eric Myers
(74) *Attorney, Agent, or Firm* — Alston & Bird LLP (57) ABSTRACT

A method for determining access point service capabilities may include identifying, at a mobile terminal, an access point to which the mobile terminal is capable of establishing a connection, determining, prior to authentication between the mobile terminal and the access point, whether the access point supports a particular service or connection, and enabling a connection determination to be made at the mobile terminal regarding whether to connect to the access point based on whether the access point supports the particular service or connection. A corresponding computer program product and apparatuses are also provided.

18 Claims, 4 Drawing Sheets

(51) Int. Cl.
*H04W 36/36* (2009.01)
*H04W 48/08* (2009.01)

(58) Field of Classification Search
USPC .............. 370/252, 312, 328–329, 331, 338; 455/434–437
See application file for complete search history.

(56) References Cited

U.S. PATENT DOCUMENTS

| | | | |
|---|---|---|---|
| 2006/0045098 A1* | 3/2006 | Krause | H04L 69/162 370/396 |
| 2006/0135066 A1 | 6/2006 | Banerjea | |
| 2007/0072638 A1 | 3/2007 | Yang et al. | |
| 2009/0175250 A1* | 7/2009 | Mathur | H04W 48/20 370/338 |
| 2009/0245133 A1 | 10/2009 | Gupta et al. | |
| 2009/0319667 A1* | 12/2009 | Bansal et al. | 709/227 |
| 2010/0271978 A1* | 10/2010 | Gupta et al. | 370/254 |
| 2012/0129533 A1* | 5/2012 | Karaoguz et al. | 455/437 |

FOREIGN PATENT DOCUMENTS

| | | |
|---|---|---|
| EP | 2 166 799 | 3/2010 |
| WO | WO-2006/043956 | 4/2006 |
| WO | WO-2007/103055 | 9/2007 |

OTHER PUBLICATIONS

Office Action from related Russian Patent Appl. No. 2012151940/08(082850), dated Feb. 28, 2014.
Office Action from Chinese Patent Application No. 201180020117.0, dated Sep. 3, 2014.
Written Opinion from International Application No. PCT/IB2011/051761 dated Aug. 17, 2011.
Penttinen, Joonas; "An Internet Service Connectivity Protocol for Mobile Devices in Unknown IP Network Environments"; Aalto University; School of Science and Technology; Faculty of Electronics, Communications and Automation; Feb. 22, 2010; 104 pages.
Office Action for Chinese Application No. 201180020117.0 dated Mar. 10, 2015.
Extended European Search Report for corresponding European Application No. 11771677.9 dated Apr. 29, 2016, 7 pages.
Office Action for Chinese Application No. 201180020117.0 dated Sep. 21, 2015.

* cited by examiner

METHOD AND APPARATUS FOR DETERMINING ACCESS POINT SERVICE CAPABILITIES

TECHNOLOGICAL FIELD

Embodiments of the present invention relate generally to network communication technology and, more particularly, relate to a method, apparatus and computer program product for providing a determination as to the service capabilities of an access point.

BACKGROUND

The modern communications era has brought about a tremendous expansion of wireline and wireless networks. Computer networks, television networks, and telephony networks are experiencing an unprecedented technological expansion, fueled by consumer demand. Networking technologies have addressed related consumer demands, while providing more flexibility and immediacy of information transfer.

Current and future networking technologies continue to facilitate ease of information transfer and convenience to users by expanding the capabilities of electronic devices and by improving network performance. One area in which there is a demand to increase ease of information transfer relates to the delivery of services to a user of an electronic device. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. Alternatively, the network device may respond to commands or request made by the user (e.g., content searching, mapping or routing services, etc.). The services may be provided from a network server or other network device, or even from a mobile terminal such as, for example, a mobile telephone, a mobile navigation system, a mobile computer, a mobile television, a mobile gaming system, etc.

Mobile users are being provided with increasingly easy access to these services via different access mechanisms. For example, users may access network services via 3G in some cases and may access services via a more localized network (e.g., a wireless local area network (WLAN) such as a WiFi network) at other times. Access via a third-generation network (3G) is often granted based on a subscription with the operator of the network or through roaming arrangements made between operators. However, more localized networks such as WiFi can sometimes be accessed by specific access points or hotspots that may either be free or may offer access responsive to user payment.

Some types of services correspond to particular types of traffic and, as may be expected, some types of traffic consume more resources and/or have different protocols for communication and security than others. Particularly for hotspot operators, the ability to block certain types of traffic may enable them to manage the types of services they allow access to via their corresponding hotspot. The decision to block certain types of traffic may, for example, be business related (e.g., to avoid providing free or cheap access to services that are costly to support) or may be based on a desire to ensure that congestion causing traffic is not permitted to ensure a good user experience for all users. Regardless of the motivation, certain types of traffic have been commonly singled out for blocking at some access points or hotspots. Examples of commonly blocked types of traffic comprise virtual private network (VPN) traffic, Voice over Internet Protocol (VoIP) traffic, video streaming traffic, secure shell (SSH) traffic, and/or the like.

Some of the types of traffic referred to above rely upon the user datagram protocol (UDP). There is no congestion control mechanism with UDP. Accordingly, if many hotspot users start initiating UDP traffic for services such as streaming video via the hotspot, the bandwidth of the hotspot may be rapidly consumed. Thus, there may not be enough bandwidth left for other users to search the web or use other applications with transmission control protocol (TCP). Since control over providing allocations of resources to specific users of a hotspot is often costly and requires additional management overhead, most hotspot operators avoid resource allocation control and instead simply opt to block certain types of traffic that tend to be problematic from a resource consumption standpoint. Thus, for example, certain UDP traffic may be blocked and therefore VPN connections may not be possible to be set up, VoIP calls may not go through, and video streaming and other UDP applications may not work either.

Unfortunately, conventionally users are unable to determine prior to connecting to a hotspot, whether the hotspot will allow access to specific services (e.g., VPN, VoIP, video streaming, etc.). Accordingly, the user is typically required to connect to the hotspot and try to access the applications or services desired without knowing whether the services they ultimately desire to access will be supported. In some cases, users may have to pay in order to connect to the hotspot only to thereafter find out, when the services they wish to access are blocked, that the sole or substantial reason for their purchase cannot be satisfied by the hotspot to which they have connected. It may therefore be desirable to provide a mechanism by which some of the issues described above may be avoided.

BRIEF SUMMARY

A method, apparatus and computer program product are therefore provided to enable users to determine access point service capabilities or connection capabilities. Moreover, some embodiments may enable the determination of such capabilities prior to establishing a connection. Accordingly, some embodiments may provide mechanisms by which a user device (e.g., a mobile terminal) may be enabled to determine whether an access point to which the user device could attach supports or blocks specific applications or services.

In an example embodiment, a method for determining access point service capabilities is provided. The method may include identifying, at a mobile terminal, an access point to which the mobile terminal is capable of establishing a connection, determining, prior to authentication between the mobile terminal and the access point, whether the access point supports a particular service or connection, and enabling a connection determination to be made at the mobile terminal regarding whether to connect to the access point based on whether the access point supports the particular service or connection.

In another example embodiment, an apparatus for determining access point service capabilities is provided. The apparatus may include at least one processor and at least one memory including computer program code. The at least one memory and the computer program code may be configured to, with the processor, cause the apparatus to perform at least identifying, at a mobile terminal, an access point to which the mobile terminal is capable of establishing a connection, determining, prior to authentication between the mobile terminal and the access point, whether the access point supports a particular service or connection, and enabling a connection determination to be made at the mobile terminal regarding whether to connect to the access point based on whether the access point supports the particular service or connection.

In another example embodiment, a computer program product for determining access point service capabilities is provided. The computer program product may include a computer-readable storage medium bearing computer program code embodied therein for use with a computer. The computer program code may include program code instructions for identifying, at a mobile terminal, an access point to which the mobile terminal is capable of establishing a connection, determining, prior to authentication between the mobile terminal and the access point, whether the access point supports a particular service or connection, and enabling a connection determination to be made at the mobile terminal regarding whether to connect to the access point based on whether the access point supports the particular service or connection.

In another example embodiment, an apparatus for determining access point service capabilities is provided. The apparatus may include means for identifying, at a mobile terminal, an access point to which the mobile terminal is capable of establishing a connection, means for determining, prior to authentication between the mobile terminal and the access point, whether the access point supports a particular service or connection, and means for enabling a connection determination to be made at the mobile terminal regarding whether to connect to the access point based on whether the access point supports the particular service or connection.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, some embodiments of the present invention may relate to the provision of an ability for user devices to determine hotspot or access point (collectively referred to hereinafter as access points) capabilities with respect to the provision of specific client services or support for certain traffic types (e.g., service or connection capabilities). Of note, in referring generally to the capabilities of access points for the provision of specific client services or support for certain types of traffic, we are referring to the capabilities according to the configuration of such access points. Thus, for example, although some devices may have the technical ability to support certain types of traffic or services, that ability may be restricted by the configuration of the device and thus, the device may be rendered incapable of providing the corresponding service or support for certain types of traffic. However, by employing an example embodiment of the present invention, a mobile terminal (or client software operated on a mobile terminal) may be enabled to determine whether an access point will allow VPN, VoIP, video streaming, SSH, and other services or traffic to pass through without limitation. Thus, the user may be enabled to make a decision as to whether to attach to an access point with the knowledge of the service or connection capabilities (or restrictions) of the access point relative to certain services or traffic types.

Figure 1:
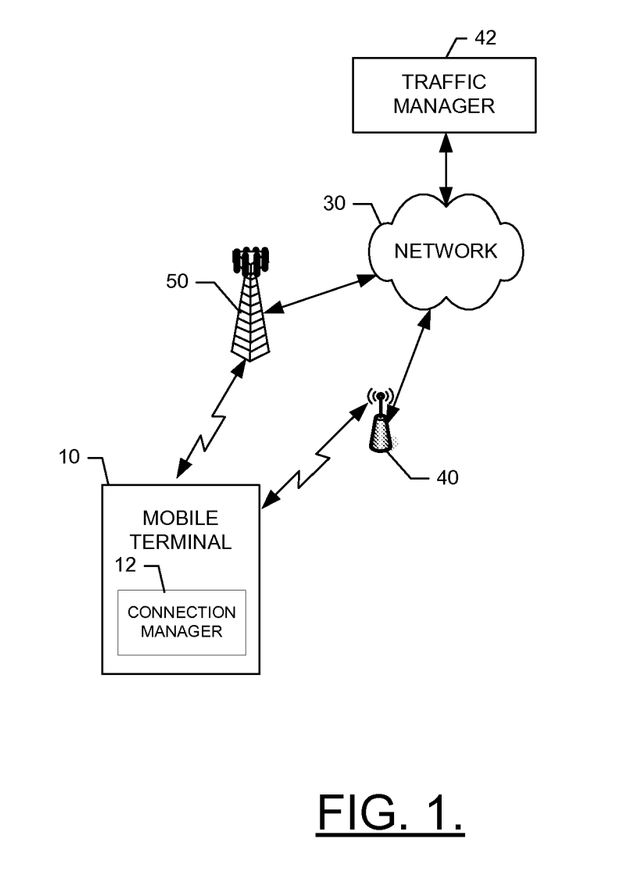
FIG. 1 is a schematic block diagram of a wireless communications system according to an example embodiment of the present invention.

FIG. 1 illustrates a generic system diagram in which a device such as a mobile terminal 10, which may benefit from embodiments of the present invention, is shown in an example communication environment. As shown in FIG. 1, a system in accordance with an example embodiment of the present invention comprises a communication device (e.g., mobile terminal 10) that may be capable of communication with a network 30. The mobile terminal 10 may be able to communicate with network devices and/or with other communication devices via the network 30.

While an example embodiment of the mobile terminal 10 may be illustrated and hereinafter described for purposes of example, numerous types of mobile terminals, such as portable digital assistants (PDAs), pagers, mobile Internet devices, mobile telephones, gaming devices, laptop computers, cameras, camera phones, video recorders, audio/video player, radio, positioning (e.g., global positioning system (GPS)) devices, navigation devices, or any combination of the aforementioned, and other types of voice and text communications systems, may readily employ or benefit from embodiments of the present invention. Furthermore, devices that are not mobile may also readily employ embodiments of the present invention. As such, for example, a network access point 40 or a base station 50 that may provide access for the mobile terminal 10 to communicate with the network 30 may also employ some embodiments of the present invention.

In some embodiments, not all systems that employ embodiments of the present invention may comprise all the devices illustrated and/or described herein and some systems that employ embodiments of the present invention may employ more devices than those illustrated and described herein. Moreover, while some embodiments may simply be practiced on a single device (e.g., the mobile terminal 10 or the access point 40) in a stand alone mode, other embodiments may be practiced on devices in a distributed fashion.

In an example embodiment, the network 30 comprises a collection of various different nodes, devices or functions that are capable of communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Additionally, in some embodiments, the network 30 may represent multiple interconnected networks. For example, the base station 50 may provide the mobile terminal 10 with access to one or more cellular or mobile networks such as those listed above, while the access point 40 may provide access to a data network, such as a local area network (LAN), a metropolitan area network (MAN), and/or a wide area network (WAN), such as the Internet.

The mobile terminal 10 may be capable of communication with other terminals and network devices via the network 30 (e.g., via the access point 40 or the base station 50) and may comprise an antenna or antennas for transmitting signals to and for receiving signals from a base site (e.g., the access point 40 or the base station 50). In turn, other devices such as processing devices or elements (e.g., personal computers, server computers or the like) may be coupled to the mobile terminal 10 via the network 30. By directly or indirectly connecting the mobile terminal 10 to other devices and to the network 30, the mobile terminal 10 may be enabled to communicate with the other devices, for example, according to numerous communication protocols including Hypertext Transfer Protocol (HTTP) and/or the like, to thereby carry out various communication or other functions of the mobile terminal 10.

Accordingly, although not specifically shown in FIG. 1, the mobile terminal 10 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 may be enabled to communicate with the network 30 by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, WiFi and/or the like and fixed access mechanisms such as digital subscriber line (DSL), cable modems, Ethernet and/or the like.

In some cases, communication between the mobile terminal 10 and the network 30 may be controlled, managed, monitored or otherwise impacted by a traffic manager 42. The traffic manager 42 of this example embodiment is shown as a network device. However, in some embodiments, the traffic manager 42 may be embodied at the access point 40 (or the base station 50) or between the access point 40 (or base station 50) and the network 30. The traffic manager 42 may be a filter, firewall or other device configured to block traffic having selected characteristics (e.g., UDP traffic) or using specific ports (eg UDP ports 6970-9999 for streaming, TCP 554 or 7070 for RTSP over TCP). In some embodiments, the traffic manager 42 may also comprise hardware and/or devices for handling (e.g., either directly or via execution of software) communication session setup and maintenance between the access point 40 and a communication device attempting to access the network 30 (e.g., the mobile terminal 10). As such, the traffic manager 42 may have any number of functions or associations with providing various communication management services.

The mobile terminal 10 may comprise a connection manager 12, which may be configured to manage communication session setup and maintenance between the mobile terminal 10 and the network 30 (e.g., via the access point 40 or the base station 50). In some embodiments, the connection manager 12 may be embodied as an apparatus comprising hardware and/or components for handling (e.g., either directly or via execution of software) communication session setup and maintenance for the mobile terminal 10. However, in some embodiments, the connection manager 12 may be embodied as a functional entity that is provided via client software executed on hardware resources of the mobile terminal 10.

Figure 2:
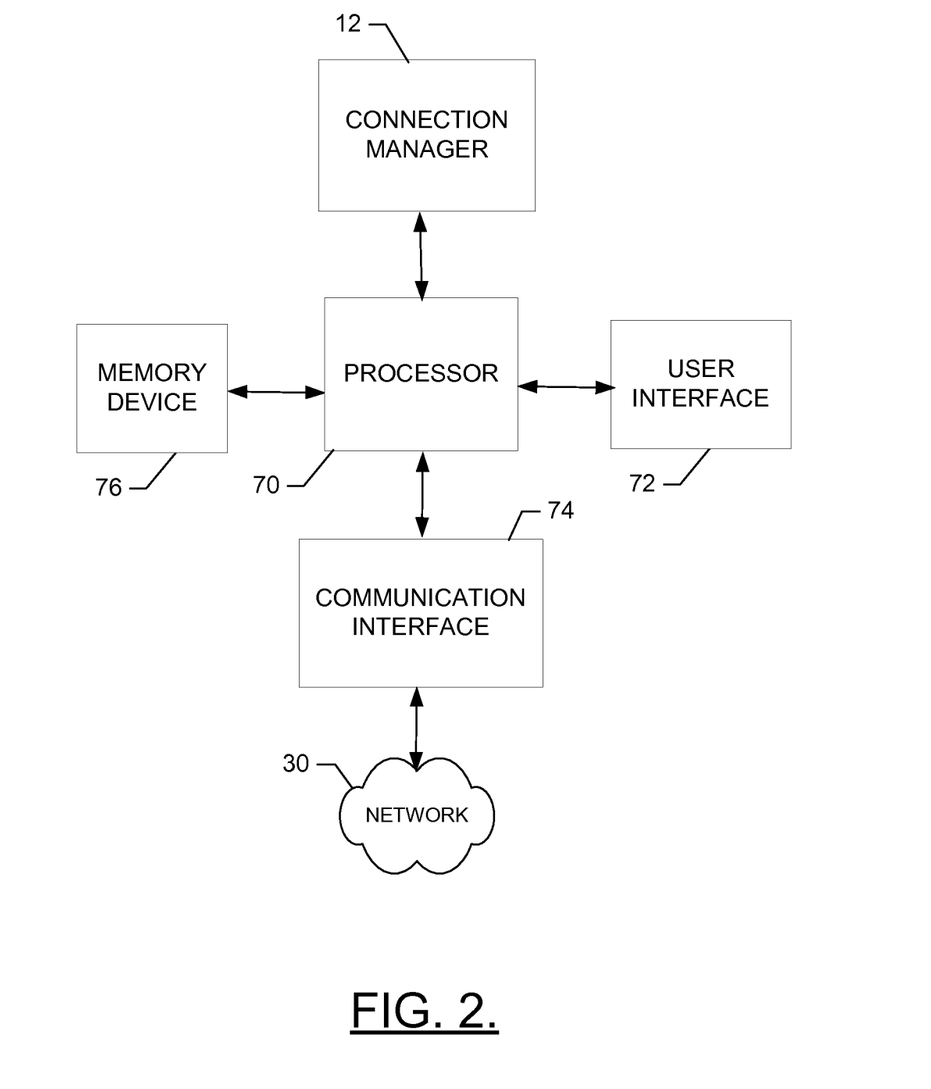
FIG. 2 illustrates a block diagram of an apparatus for providing a determination as to the service capabilities or connection capabilities of an access point according to an example embodiment of the present invention.

FIG. 2 illustrates a schematic block diagram of an apparatus for providing a determination as to the service capabilities or connection capabilities of an access point according to an example embodiment of the present invention. An example embodiment of the invention will now be described with reference to FIG. 2, in which certain elements of an apparatus for providing a determination as to the service capabilities or connection capabilities of an access point are displayed. The apparatus of FIG. 2 may be employed, for example, on the mobile terminal 10 and/or another communication device. However, it should be noted that the devices or elements described below may not be mandatory and thus some may be omitted in certain embodiments. Furthermore, additional components may be included in some embodiments.

Referring now to FIG. 2, an apparatus for providing a determination as to the service capabilities or connection capabilities of an access point is provided. The apparatus may comprise or otherwise be in communication with a processor 70, a user interface 72, a communication interface 74 and a memory device 76. The memory device 76 may comprise, for example, one or more volatile and/or non-volatile memories. In other words, for example, the memory device 76 may be an electronic storage device (e.g., a computer readable storage medium) comprising gates or other structures defining memory cells configured to store data (e.g., bits) that may be retrievable by a machine (e.g., a computing device). The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., the mobile terminal 10 or a network device) adapted for employing embodiments of the present invention by further configuration of the processor 70 by instructions for performing the algorithms and/or operations described herein. By executing the instructions or programming provided thereto or associated with the configuration of the processor 70, the processor 70 may cause corresponding functionality to be performed. The processor 70 may comprise, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may comprise, for example, an antenna (or multiple antennas) and supporting hardware and/or software for enabling communications with a wireless communication network. In some environments, the communication interface 74 may alternatively or also support wired communication. As such, for example, the communication interface 74 may comprise a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may comprise, for example, a keyboard, a mouse, a joystick, a display, a touch screen, soft keys, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device (e.g., the mobile terminal 10 or the second communication device 20), the user interface 72 may comprise, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an exemplary embodiment, the processor 70 may be embodied as, comprise or otherwise control the connection manager 12. As such, in some embodiments, the processor 70 may be said to cause, direct or control the execution or occurrence of the various functions attributed to the connection manager 12 as described herein. The connection manager 12 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the connection manager 12 as described herein. Thus, in examples in which software is employed, a device or circuitry (e.g., the processor 70 in one example) executing the software forms the structure associated with such means.

In an example embodiment, the connection manager 12 may generally be configured to determine whether an access point (e.g., access point 40) with which the mobile terminal 10 is capable of establishing a connection supports certain services or types of traffic. As such, the connection manager 12 may be enabled to determine service or traffic restrictions that the access point 40 has even prior to associating (e.g., establishing a layer 2 connection) with the access point 40. In other words, the connection manager 12 may be configured to determine the "friendliness" of the access point 40 to VPN, VoIP, streaming content, SSH, etc., even prior to associating/connecting with the access point. The connection manager 12 may be configured to perform the determination via any of a number of different possible solutions described herein. Some of the solutions that will be described herein may mainly involve activities undertaken at the connection manager 12. However, some solutions may involve participation of other entities such as, for example, the access point 40, the traffic manager 42, or an apparatus disposed at the access point 40, the traffic manager 42 or some other network device.

In an example embodiment, the connection manager 12 may be configured to access a user profile or other settings that may define user preferences for connection establishment with respect to information determined regarding access point service or connection capabilities. For example, the connection manager 12 may be configured to access profile information that designates a preference of the user with respect to connecting automatically to access points based on certain criteria. In some embodiments, one of the criteria upon which a decision may be made to automatically establish a connection between the mobile terminal 10 and the access point 40 may be whether the access point 40 supports a particular service (or group of services) as may be indicated by the traffic types or classes that are supported by the access point. Thus, for example, the user may establish rules or provisions that prevent the connection manager 12 from establishing a connection to the access point 40 if indications are received that the access point 40 does not support certain services or a specific service of interest. In some cases, the connection may simply not be established. However, in other cases, the connection manager 12 may provide information to the user (e.g., via a display and/or audibly) to indicate that the access point 40 fails to support certain services or a specific service (or traffic class) and offer the user the choice to select or refuse a connection to the access point 40 despite the deficiency or pass on the opportunity to connect to the access point 40 (e.g., to look for a different access point 40).

Figure 3:
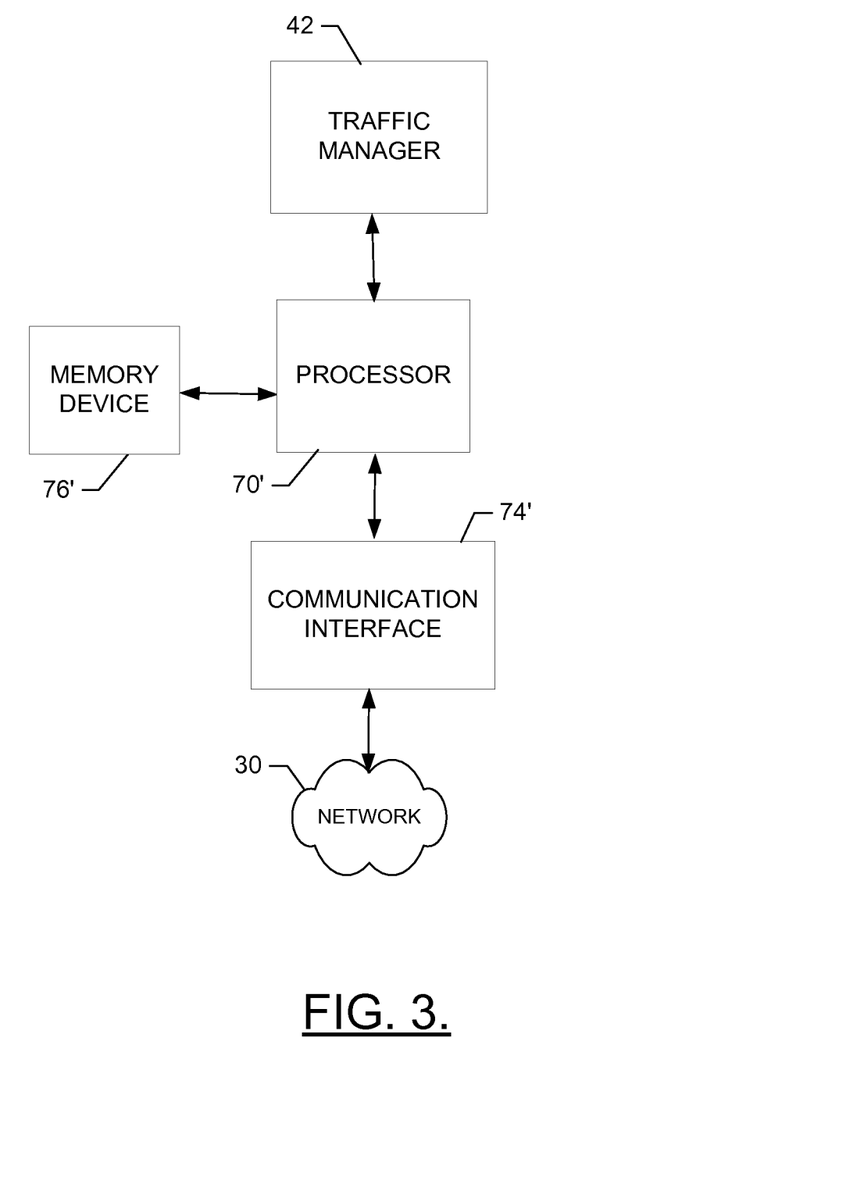
FIG. 3 illustrates a block diagram of an apparatus for facilitating a determination as to the service capabilities or connection capabilities of an access point according to an example embodiment of the present invention.

FIG. 3 illustrates an example of an apparatus for facilitating determination as to the service capabilities or connection capabilities of an access point according to an example embodiment. In this regard, for example, the apparatus may comprise or otherwise be in communication with a processor 70', a communication interface 74' and a memory device 76'. The processor 70', the communication interface 74' and the memory device 76' may be substantially similar in function and basic structure (with perhaps semantic and/or scale differences in some cases) to the descriptions provided above for the processor 70, the communication interface 74 and the memory device 76 of the network side apparatus. Thus, descriptions of these components will not be repeated.

In an example embodiment, the processor 70' may be embodied as, comprise or otherwise control the traffic manager 42. As such, in some embodiments, the processor 70' may be said to cause, direct or control the execution or occurrence of the various functions attributed to the traffic manager 42 as described herein. In an example embodiment, the traffic manager 42 may be configured to communicate with the connection manager 12 to provide information that may be used by the connection manager 12 to determine the service capability or connection capability of an access point (e.g., access point 40) with which the mobile terminal 10 is capable of establishing a connection. As such, in some cases, the connection manager 12 may be configured to determine whether the access point 40 allows or otherwise supports certain types of connections (e.g., connections relating to certain services or types of traffic (or classes)).

As indicated above, various different solutions may be provided to enable the connection manager 12 to determine access point service or connection capability prior to connection establishment with the access point 40. In one example embodiment, the connection manager 12 may be configured to "silently" associate with the access point in order to test support for desired services or classes of traffic. Thus, for example, the connection manager 12 may establish test communications (e.g., without formally connecting) with the access point 40 (e.g., via the traffic manager 42). The connection manager 12 may then attempt to set up various connections with desirable services via the access point 40. For example, the connection manager 12 may attempt to make a test VoIP connection, set up a VPN connection, or initiate video streaming in the background automatically, without user involvement (or perhaps knowledge). If some or all of the test connections succeed, the connection manager 12 may indicate (e.g., via the user interface 72) the list of accessible access points and their connection capabilities (e.g., AP1 does not support VPNs, AP2 does not support VoIP, AP3 does not allow video streaming, etc) or inform the user of the success or successes and/or the failure or failures. In some embodiments, the user may configure the connection manager 12 to test for specific selected services, types of applications or classes of traffic prior to enabling association with the access point 40. As indicated above, the user may perform this configuration via profile information or other selectable settings. The user may also define conditional behavior to be conducted based on information on the support for specific selected services, types of applications or classes of traffic that is determined by the connection manager 12. For example, the user may specify that VPN, VoIP, and video streaming capabilities are to be tested and, responsive to information on the support for these services, an automatic connection is to be established if a specific one (or two or all in alternative embodiments) is available, whereas the user is to be informed and asked if connection is to be established if the specific desired services (or less than a threshold number of desired services) are not available. Furthermore, in example embodiments in which multiple access points are candidates for connection for the mobile terminal 10, the connection manager 12 may be configured to sequentially test the capabilities of each respective access point to determine the service capabilities of each.

In an alternative solution, another possibility for detecting service (e.g., VPN, VoIP, etc.) friendliness (e.g., the service or connection capabilities) of the access point 40 is to define an Info ID (e.g., for the Access Network Query Protocol) that may be used by the client stations (e.g., the mobile terminal 10) to send test messages to test VPN, VoIP, streaming, SSH, etc. connections, encapsulated into 802.11 frames to an access point prior to associating with the access point. For example, the VPN test message may be encapsulated into IEEE 802.11 standard frames at the mobile terminal 10. The access point 40 (e.g., via the traffic manager 42) may, if the access point supports such activity, decapsulate the packet and send it to its destination using its own IP address. When a response is received, the access point 40 may encapsulate the response into 802.11 frames, and send the response to the mobile terminal 10. The mobile terminal 10, having received a response to the test message may determine that the corresponding service (or traffic classification) is supported by the access point 40. The use of the Info ID may be useful in determining access point capabilities with regard to certain services without requiring the mobile terminal to establish a test association with the access point 40. Thus, the mobile terminal 10 does not need to configure its interface to test sending and receiving of various types of IP packets. Instead, for example, when the mobile terminal 10 discovers a beacon of the access point 40, the mobile terminal 10 may determine whether a specific service (e.g., via the service information identifier for the Access Network Query Protocol) is supported.

Some VPN Gateways, or VoIP service providers, or streaming servers may set up a listening socket for such test messages. When these remote servers/gateways receive a test message from a client device (e.g., the mobile terminal 10), they will echo back the response, which will then be relayed by the access point to the client device. Such a capability of a Server/Gateway may greatly simplify the test procedure. In some embodiments, a listening socket may listen to a port preconfigured in the client device, or the client device may have a way to discover the port number where it can send such test messages. In an alternative embodiment, a new advertisement protocol ID for the generic advertisement service (GAS) protocol may be defined for this purpose.

In some example embodiments, to detect VPN friendliness, the connection manager 12 (or perhaps other client software) may be configured to check whether Internet key exchange (IKE) messages (usually UDP protocol using port 500 or 4500) are allowed to be communicated via the access point 40 and/or whether generic UDP encapsulated traffic is allowed. Corporate VPN gateways or other gateway devices (of which the traffic manager 42 could be an example in some embodiments) may, in some cases, have their own port on which they expect IKE traffic to arrive, and the ports may be different from gateway to gateway. As such, for example, a test listening port may be designated in the VPN gateway, which may be known by a VPN client (e.g., associated with the connection manager 12), which may send the IKE and the UDP encapsulated packets to this port. If there is a response, then the access point 40 may be determined to be service (or VPN in this example) friendly. If no response is received, it may be determined that the access point 40 is not service friendly. For VoIP, the client may attempt to initiate a test VoIP call. Thus, for example, if one test VoIP call with an arbitrary service provider goes through, then it is likely that all the VoIP applications in the client would be successful. Thus, when a test is successfully conducted, the access point 40 may be marked or otherwise identified as a VoIP friendly hotspot.

In an example embodiment, when the connection manager 12 detects that the mobile terminal 10 has a VPN connection on another active interface (e.g., 3G via the base station 50), and a profile accessible to the connection manager 12 provides instructions that in such situations the connection manager 12 is directed to determine whether mobility of the VPN connection is supported, the connection manager 12 may be configured to test whether VPN mobility and multihoming (MOBIKE) messages are allowed to be communicated through the access point 40 during consideration of whether to connect to the access point 40. If MOBIKE messages are not allowed to be communicated, then the connection manager 12 may be configured to inform the end user that, if the access point 40 is selected for connection, then the VPN connection would be lost and would need to be set up again manually after connecting to the access point. Otherwise, after connecting to the access point 40, the connection manager 12 may be configured to use MOBIKE to transfer the VPN connection seamlessly through a newly selected access point.

In another alternative solution, the access point 40 (e.g., via the traffic manager 42) may be configured with information descriptive of its capabilities (e.g., with respect to services and/or connections supported). Thus, for example, the access point 40 may comprise one or more capability descriptors identifying the services and/or traffic classifications that are supported by the access point 40. In some cases, the access point 40 could be configured to provide a capability bit providing an indication that the access point 40 has application capability information (e.g., the capability descriptors relating to connection or service capabilities) about its capabilities that could be provided to client devices even before association. Accordingly, communication devices receiving a beacon frame may be able to determine that the corresponding access point has the ability to provide a capability descriptor if the capability bit is set. In some embodiments, both active and passive scans conducted by the mobile terminal 10 may allow the mobile terminal 10 (as an example of a client device) to identify the access points which can provide their connection capability information. When this capability information bit is set, the mobile terminal 10 may be able to query the access point for either the list of connection capabilities it has, or ask the access point if a certain type of connection is supported. As such, in some embodiments, the connection manager 12 may be enabled to receive either the capability descriptor itself (e.g., identifying the connection capabilities) or identifying that the connection manager 12 can be provided with capability descriptors upon request. In some embodiments, the connection manager 12 may employ a GAS mechanism to query the access terminal 40 for the capability descriptor to determine which applications or services are supported (and perhaps also or alternatively which applications are not supported) by the access point 40. The access point 40 (e.g., via the traffic manager 42) may be configured to provide a response to the query to indicate one or more capability descriptors regarding a set of services/applications that are not supported or supported by the access point 40 or to provide an answer with respect to any service specific query that may be received. In some embodiments, the GAS mechanism may be a mechanism that may be used in pre-associated states (e.g., before the mobile terminal 10 is associated with the access point 40) to determine whether an access point to which a connection may potentially be established supports one or more applications and/or services that the user of the mobile terminal 10 considers to be a priority. Although a GAS mechanism may also be employed in post-associated states, employing the GAS mechanism during pre-associated states may enable the connection or service capabilities of the access point to be determined before setting up a layer 2 connection to provide a better user experience (e.g., since connecting to access points that cannot support the connection and/or service the user desires can be frustrating to users).

In still another alternative solution, a UDP port may be reserved for testing as to whether UDP encapsulation packets are allowed to be communicated through a particular access point (e.g., access point 40). In such example cases, the provider of the access point 40 may establish a service platform, such as a stub server, which may be at the access point 40 itself or perhaps in a router or firewall with which the access point 40 is capable of communicating (e.g., the traffic manager 42). Since access points typically do not allow IP packets to be communicated to a VPN gateway or allow VoIP signaling to be communicated prior to being authorized and establishing a connection, example embodiments may be configured to enable the access point 40 to allow IP packets to be communicated for testing purposes through the reserved or designated port (e.g., a port reserved through the Internet assigned numbers authority (IANA) for such testing). The connection manager 12 may communicate UDP encapsulated packets to the reserved UDP port at an IP address which is determined via either out-of-band means or through a parameter that can be advertised via the beacon of the access point 40 or alternatively the link-local IPv4 or IPv6 address. Successful testing of echo packets to the reserved UDP port may enable the connection manager 12 to determine the corresponding types of services and applications supported at the access point 40. The host device (e.g., the mobile terminal 10) may be configured to use the IPv6 link-local address or the IPv4 link-local address as the source address for the UDP packets used to test the access point 40. The access point is configured to allow these specific test packets to pass through while all other packets are blocked prior to authentication and authorization for access.

Accordingly, some example embodiments (e.g., the second and third examples described above) may enable the mobile terminal 10 (e.g., via the connection manager 12) to discover the connection or service capabilities of the access point 40 before connecting to the access point 40. Meanwhile, other embodiments, (e.g., the first and fourth examples described above, may enable the device to establish a test connection (e.g., establish a layer 2 connection) to the access point 40. If the access point 40 is RSNA enabled, a key may be required to connect to the access point 40, and clients not in possession of this key may not be able to use the test connection based mechanisms. If the access point 40 is not RSNA enabled, then any client may be able to associate with the access point 40 without requiring authentication. The mechanisms described in the first and fourth examples may then be used by clients after associating with the access point 40 (e.g., for testing purposes), but before authenticating with the access point 40. Thus, in all cases, a determination may be made as to the connection capabilities of an access point to support certain services prior to authentication of a mobile device to the access point. However, in some embodiments, the connection capabilities determination may not only be made prior to authentication, but may be made prior to connecting to the access point at all.

Figure 4:
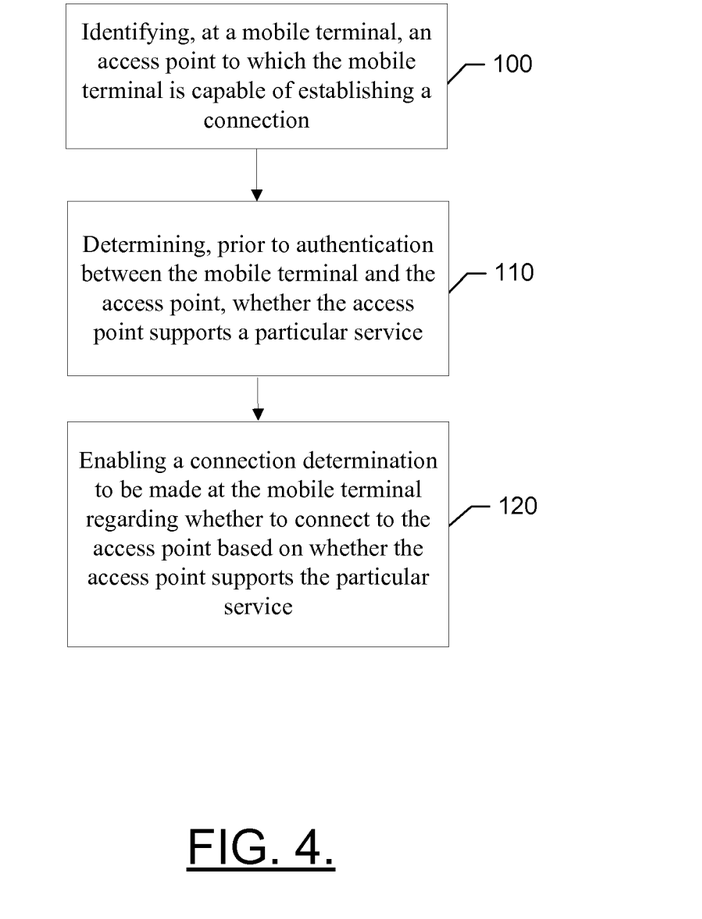
FIG. 4 is a flowchart according to another example method for providing a determination as to the service capabilities or connection capabilities of an access point according to an example embodiment of the present invention.

FIG. 4 is a flowchart of a method and program product according to example embodiments of the invention. It will be understood that each block of the flowchart, and combinations of blocks in the flowchart, may be implemented by various means, such as hardware, firmware, processor, circuitry and/or other device associated with execution of software comprising one or more computer program instructions. For example, one or more of the procedures described above may be embodied by computer program instructions. In this regard, the computer program instructions which embody the procedures described above may be stored by a memory device of a user terminal or network device and executed by a processor in the user terminal or network device. As will be appreciated, any such computer program instructions may be loaded onto a computer or other programmable apparatus (e.g., hardware) to produce a machine that provides means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implement the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may comprise identifying, at a mobile terminal, an access point to which the mobile terminal is capable of establishing a connection at operation 100. The method may further comprise determining, prior to authentication between the mobile terminal and the access point, whether the access point supports a particular service or connection at operation 110 and enabling a connection determination to be made at the mobile terminal regarding whether to connect to the access point based on whether the access point supports the particular service or connection at operation 120.

In some embodiments, certain ones of the operations above may be modified or further amplified as described below. It should be appreciated that each of the modifications or amplifications below may be included with the operations above either alone or in combination with any others among the features described herein. In an example embodiment, identifying the access point may comprise receiving a beacon signal and determining whether the access point supports the particular service (or connection type) may be accomplished pursuant to receipt of a capability bit in the beacon signal. In some cases, determining whether the access point supports the particular service (or connection type) may comprise causing communication of a request for a capability descriptor responsive to the capability bit being set and determining whether a response is received to the request for the capability descriptor. In some embodiments, determining whether the access point supports the particular service (or connection type) may comprise the use of an information identifier (e.g., Info ID) that may be used to send a test message according to a protocol associated with a particular service (or connection type) to be handled and passed on by the access point and monitoring for receipt of a response to communication of the test message. In an example embodiment, determining whether the access point supports the particular service (or connection type) may not only be accomplished prior to authentication between the mobile terminal and the access point, but may be accomplished prior to connection establishment between the mobile terminal and the access point. In an example embodiment, determining whether the access point supports the particular service (or connection type) may comprise initiating a test connection to the access point in order to perform test setup procedures relative to the particular service. In some embodiments, determining whether the access point supports the particular service (or connection type) may comprise initiating a connection to a reserved test port in order to perform test setup procedures relative to the particular service (or connection type). In some embodiments, enabling the connection determination to be made may comprise referencing a user profile to determine whether to establish a connection between the mobile terminal and the access point based on user defined criteria for connection establishment based on whether the access point supports the particular service (or connection type). In an example embodiment, enabling the connection determination to be made may comprise providing a user with information indicating whether the access point supports the particular service (or connection type) and options as to whether to establish the connection to the access point.

In an example embodiment, an apparatus for performing the method of FIG. 4 above may comprise a processor (e.g., the processor 70) configured to perform some or each of the operations (100-120) described above. The processor may, for example, be configured to perform the operations (100-120) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-120 may comprise, for example, the processor 70, the connection manager 12, and/or a device or circuit for executing instructions or executing an algorithm for processing information as described above.

An example of an apparatus according to an example embodiment may comprise at least one processor and at least one memory comprising computer program code. The at least one memory and the computer program code may be configured to, with the at least one processor, cause the apparatus to perform the operations 100-120 (with or without the modifications and amplifications described above in any combination).

An example of a computer program product according to an example embodiment may comprise at least one computer-readable storage medium having computer-executable program code portions stored therein. The computer-executable program code portions may comprise program code instructions for performing operation 100-120 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:
1. A method comprising:
identifying, at a mobile terminal, an access point to which the mobile terminal is capable of establishing a connection;
determining, prior to authentication between the mobile terminal and the access point, whether the access point supports a particular service or connection, wherein determining whether the access point supports the particular service or connection is accomplished by initiating a connection to a reserved user datagram protocol test port that has been reserved for testing purposes in order to perform a test setup procedure relative to the particular service or connection; and
enabling a connection determination to be made at the mobile terminal regarding whether to connect to the access point based on whether the access point supports the particular service or connection, wherein enabling the connection determination to be made further comprises referencing a user profile to determine whether to establish a connection between the mobile terminal and the access point based on user defined criteria for connection establishment based on whether the access point supports the particular service or connection as indicated by one or more traffic types supported by the access point.

2. The method of claim 1, wherein identifying the access point further comprises receiving a beacon signal and wherein determining whether the access point supports the particular service or connection comprises determining whether the access point supports the particular service or connection based on a capability bit in the beacon signal.

3. The method of claim 2, wherein determining whether the access point supports the particular service or connection further comprises causing communication of a request for a capability descriptor responsive to the capability bit being set and determining whether a response is received to the request for the capability descriptor.

4. The method of claim 1, wherein enabling the connection determination to be made further comprises providing a user with information indicating whether the access point supports the particular service or connection and providing the user with a selectable option as to whether to establish a connection to the access point.

5. The method of claim 1, wherein determining whether the access point supports a particular service or connection comprises determining whether internet key messages or user datagram protocol encapsulated traffic are allowed via a gateway device.

6. The method of claim 1, wherein determining whether the access point supports a particular service or connection comprises determining whether virtual private network mobility and multihoming messages (MOBIKE) are allowed to be communicated through the access point.

7. An apparatus comprising at least one processor and at least one memory including computer program code, the at least one memory and the computer program code configured to, with the processor, cause the apparatus to at least:
identify, at a mobile terminal, an access point to which the mobile terminal is capable of establishing a connection;
determine, prior to authentication between the mobile terminal and the access point, whether the access point supports a particular service or connection, by initiating a connection to a reserved user datagram protocol test port that has been reserved for testing purposes in order to perform a test setup procedure relative to the particular service or connection; and
enable a connection determination to be made at the mobile terminal regarding whether to connect to the access point based on whether the access point supports the particular service or connection, wherein the at least one memory and the computer program code are further configured to, with the processor, cause the apparatus to
enable the connection determination to be made by referencing a user profile to determine whether to establish a connection between the mobile terminal and the access point based on user defined criteria for connection establishment-based on whether the access point supports the particular service or connection as indicated by one or more traffic types supported by the access point.

8. The apparatus of claim 7, wherein the at least one memory and the computer program code are further configured to, with the processor, cause the apparatus to identify the access point by receiving a beacon signal and to determine whether the access point supports the particular service or connection by determining whether the access point supports the particular service or connection based on a capability bit in the beacon signal.

9. The apparatus of claim 8, wherein the at least one memory and the computer program code are further configured to, with the processor, cause the apparatus to determine whether the access point supports the particular service or connection by causing communication of a request for a capability descriptor responsive to the capability bit being set and determining whether a response is received to the request for the capability descriptor.

10. The apparatus of claim 7, wherein the at least one memory and the computer program code are further configured to, with the processor, cause the apparatus to enable the connection determination to be made by providing a user with information indicating whether the access point supports the particular service or connection and providing the user with a selectable option as to whether to establish a connection to the access point.

11. The apparatus of claim 4, wherein the at least one memory and the computer program code are configured to, with the processor, cause the apparatus to determine whether the access point supports a particular service or connection by determining whether internet key messages or user datagram protocol encapsulated traffic are allowed via a gateway device.

12. The apparatus of claim 7, wherein the at least one memory and the computer program code are configured to, with the processor, cause the apparatus to determine whether the access point supports a particular service or connection by determining whether virtual private network mobility and multihoming messages (MOBIKE) are allowed to be communicated through the access point.

13. A computer program product comprising a non-transitory computer-readable storage medium bearing computer program code embodied therein for use with a computer, the computer program code comprising program code instructions for:
identifying, at a mobile terminal, an access point to which the mobile terminal is capable of establishing a connection;
determining, prior to authentication between the mobile terminal and the access point, whether the access point supports a particular service or connection, wherein determining whether the access point supports the particular service or connection is accomplished by initiating a connection to a reserved user datagram protocol test port that has been reserved for testing purposes in order to perform a test setup procedure relative to the particular service or connection; and
enabling a connection determination to be made at the mobile terminal regarding whether to connect to the access point based on whether the access point supports the particular service or connection, wherein program code instructions for enabling the connection determination to be made include instructions for referencing a user profile to determine whether to establish a connection between the mobile terminal and the access point based on user defined criteria for connection establishment based on whether the access point supports the particular service or connection as indicated by one or more traffic types supported by the access point.

14. The computer program product of claim 13, wherein program code instructions for identifying the access point further comprise program code instructions for receiving a beacon signal and wherein the program code instructions for determining whether the access point supports the particular service or connection comprise program code instructions for determining whether the access point supports the particular service or connection based on a capability bit in the beacon signal.

15. The computer program product of claim 14, wherein program code instructions for determining whether the access point supports the particular service or connection include instructions for causing communication of a request for a capability descriptor responsive to the capability bit being set and determining whether a response is received to the request for the capability descriptor.

16. The computer program product of claim 13, wherein program code instructions for enabling the connection determination to be made include instructions for providing a user with information indicating whether the access point supports the particular service or connection and providing the user with a selectable option as to whether to establish a connection to the access point.

17. The computer program product of claim 13, wherein the program code instructions for determining whether the access point supports a particular service or connection comprise program code instructions for determining whether internet key messages or user datagram protocol encapsulated traffic are allowed via a gateway device.

18. The computer program product of claim 13, wherein the program code instructions for determining whether the access point supports a particular service or connection comprise program code instructions for determining one or more types of services supported by the access point.

* * * * *